(12) United States Patent
Bell, Jr. et al.

(10) Patent No.: US 8,769,210 B2
(45) Date of Patent: *Jul. 1, 2014

(54) DYNAMIC PRIORITIZATION OF CACHE ACCESS

(75) Inventors: Robert H. Bell, Jr., Austin, TX (US); Hong L. Hua, Austin, TX (US); William A. Maron, Austin, TX (US); Mysore S. Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 246 days.

This patent is subject to a terminal disclaimer.

(21) Appl. No.: 13/323,076

(22) Filed: Dec. 12, 2011

(65) Prior Publication Data
US 2013/0151788 A1   Jun. 13, 2013

(51) Int. Cl.
*G06F 12/08*   (2006.01)
(52) U.S. Cl.
USPC .......................................... 711/140; 711/133
(58) Field of Classification Search
None
See application file for complete search history.

(56) References Cited

U.S. PATENT DOCUMENTS

| | | | | |
|---|---|---|---|---|
| 5,361,337 | A * | 11/1994 | Okin | 712/228 |
| 5,455,924 | A * | 10/1995 | Shenoy et al. | 711/118 |
| 6,907,520 | B2 * | 6/2005 | Parady | 712/228 |
| 7,360,021 | B2 | 4/2008 | Arimilli et al. | |
| 7,386,678 | B2 | 6/2008 | Guthrie et al. | |
| 7,765,362 | B2 * | 7/2010 | Guthrie et al. | 711/144 |
| 7,827,354 | B2 | 11/2010 | Clark et al. | |
| 8,037,281 | B2 * | 10/2011 | Kruger et al. | 711/207 |
| 2004/0205298 | A1 | 10/2004 | Bearden et al. | |
| 2007/0150881 | A1 | 6/2007 | Khawand et al. | |
| 2009/0172315 | A1 | 7/2009 | Iyer et al. | |
| 2010/0138811 | A1 | 6/2010 | Jayaraman et al. | |

FOREIGN PATENT DOCUMENTS

| | | |
|---|---|---|
| EP | 1158401 | 11/2001 |
| SG | 90745 | 8/2002 |

OTHER PUBLICATIONS

Le, H. Q. et al., "IBM POWER6 Microarchitecture", IBM J. Res. & Dev. vol. 51 No. 6 Nov. 2007 , pp. 639-662.

Peir, Jih-Kwon et al., "Improving Cache Performance with Full-Map Block Directory", Journal of Systems Architecture Mar. 2000 , 25 pages.

"U.S. Appl. No. 13/586,518 Office Action", Dec. 6, 2013, 7 pages.

* cited by examiner

*Primary Examiner* — Gary Portka
(74) *Attorney, Agent, or Firm* — DeLizio Gilliam, PLLC

(57) ABSTRACT

Some embodiments of the inventive subject matter are directed to a cache comprising a tracking unit and cache state machines. In some embodiments, the tracking unit is configured to track an amount of cache resources used to service cache misses within a past period. In some embodiments, each of the cache state machines is configured to, determine whether a memory access request results in a cache miss or cache hit, and in response to a cache miss for a memory access request, query the tracking unit for the amount of cache resources used to service cache misses within the past period. In some embodiments, the each of the cache state machines is configured to service the memory access request based, at least in part, on the amount of cache resources used to service the cache misses within the past period according to the tracking unit.

12 Claims, 6 Drawing Sheets

IF (REQUEST 105 RESULTS IN A CACHE MISS) AND
  (MISS COUNT > *THRESHHOLD VALUE*)

REJECT REQUEST 105;

FIG. 3A

IF (REQUEST 105 RESULTS IN A CACHE MISS) AND
  ((*HIT COUNT / MISS COUNT*) < *THRESHOLD VALUE*)

REJECT REQUEST 105;

FIG. 3B

IF (REQUEST 105 RESULTS IN A CACHE MISS) AND
  ((*HIT COUNT / MISS COUNT*) < ((*HIT COUNT / (MISS COUNT + 1)*) + *TOLERANCE FACTOR*)

REJECT REQUEST 105;

FIG. 3C

DYNAMIC PRIORITIZATION OF CACHE ACCESS

BACKGROUND

Embodiments of the inventive subject matter generally relate to the field of memory caches, and, more particularly, to prioritizing cache access.

High customer satisfaction with a computer system can hinge on how quickly a computer can access data from a memory subsystem and present the data to the user. However, computer systems can become busy attempting to access data from the memory subsystem, which affects the computer system's performance and, ultimately, can reduce customer satisfaction.

SUMMARY

Some embodiments include a cache comprising a cache directory, a cache array, and a cache controller coupled to the cache directory and the cache array. In some embodiments, the cache controller comprises a tracking unit and a plurality of cache state machines. In some embodiments, the tracking unit is configured to track an amount of cache resources used to service cache misses within a past period. In some embodiments, each of the plurality of cache state machines is configured to, determine whether a memory access request results in a cache miss or cache hit, and in response to a cache miss for a memory access request, query the tracking unit for the amount of cache resources used to service cache misses within the past period. In some embodiments, the each of the plurality of cache state machines is configured to service the memory access request based, at least in part, on the amount of cache resources used to service the cache misses within the past period according to the tracking unit.

Some embodiments include an apparatus comprising a processor and a cache controller coupled with the processor. In some embodiments, the cache controller is configured to receive memory access requests from the processor. The cache controller comprises a plurality of cache state machines. Each of the plurality of cache state machines is configured to tentatively accept one of the memory access requests, determine that the one of the memory access requests results in a cache miss, and determine an amount of usage of the plurality of cache state machines within a past period. In some embodiments, the each of the plurality of cache state machines is configured to determine that at least one of a plurality of cache state machines is to be reserved for potential future cache hits based on the amount of usage of the plurality of cache state machines within the past period in response to determination that the one of the memory access requests results in the cache miss. In some embodiments, the each of the plurality of cache state machines is configured to reject the memory access request in response to determination that at least one of the plurality of cache state machines is to be reserved for the potential future cache hits.

BRIEF DESCRIPTION OF THE DRAWINGS

The present embodiments may be better understood, and numerous objects, features, and advantages made apparent to those skilled in the art by referencing the accompanying drawings.

FIGS. 3A-3C are example conceptual diagrams of logic that evaluate counts of cache misses, caches hits, thresholds and tolerances for determining whether to reject a memory access request according to some embodiments.

DESCRIPTION OF EMBODIMENT(S)

The description that follows includes example systems, methods, techniques, instruction sequences, and computer program products that embody techniques of the present inventive subject matter. However, it is understood that the described embodiments may be practiced without these specific details. Examples refer to accessing cache to retrieve data, which can mean accessing cache to retrieve an address. In addition, embodiments can also be applied to retrieving instructions from cache. Although some examples refer to accessing data from a data cache, embodiments include accessing information from an instruction cache, a translation look-aside buffer, some combinations thereof, etc. Further, embodiments can implement different architectures that implement different levels of cache (e.g., L1-L3 cache). In other instances, well-known instruction instances, protocols, structures, and techniques have not been shown in detail in order not to obfuscate the description.

A memory subsystem includes cache memory and main memory (also referred to as system memory). A cache controller comprises state machines that carry out cache coherence operations ("cache state machines"). In some IBM® processor architectures, a cache controller includes multiple state machines that handle different aspects of cache coherence (e.g., read-claim machines, and cast-out machines). When a memory request misses in memory, the cache state machine handling the memory request is in a waiting state until data is returned from a lower level of memory. The lower level of memory could be a lower level of cache memory or system memory, which leaves the state machine in the waiting state even longer. While waiting, the cache state machine cannot service other memory requests. Cache misses can occur in clusters or bursts. For instance, complex software or multiple threads of different types of applications executing on a system can access a memory subsystem in a manner that leads to bursts of caches misses, which degrades performance. When these clustered misses occur, a majority, if not all, of the cache state machines idle in a wait state for data from the lower level of memory. While the cache state machines wait, subsequent memory requests cannot be serviced, which propagates the delay.

The microarchitecture of a cache can be modified to prevent a cluster of misses from occupying a majority of the cache state machines. A cache controller of cache can be designed with cache state machines that tentatively accept memory requests. A cache state machine of the cache controller tentatively accepts a memory requests to determine whether the memory requests hits or misses in the cache. If the memory request misses in the cache, the memory controller will reject the memory request if a current hit/miss ratio indicates that cache state machines should be reserved for potential hits. Thus, the cache state machine can quickly move on to service another memory request that may hit in the cache.

Figure 1:
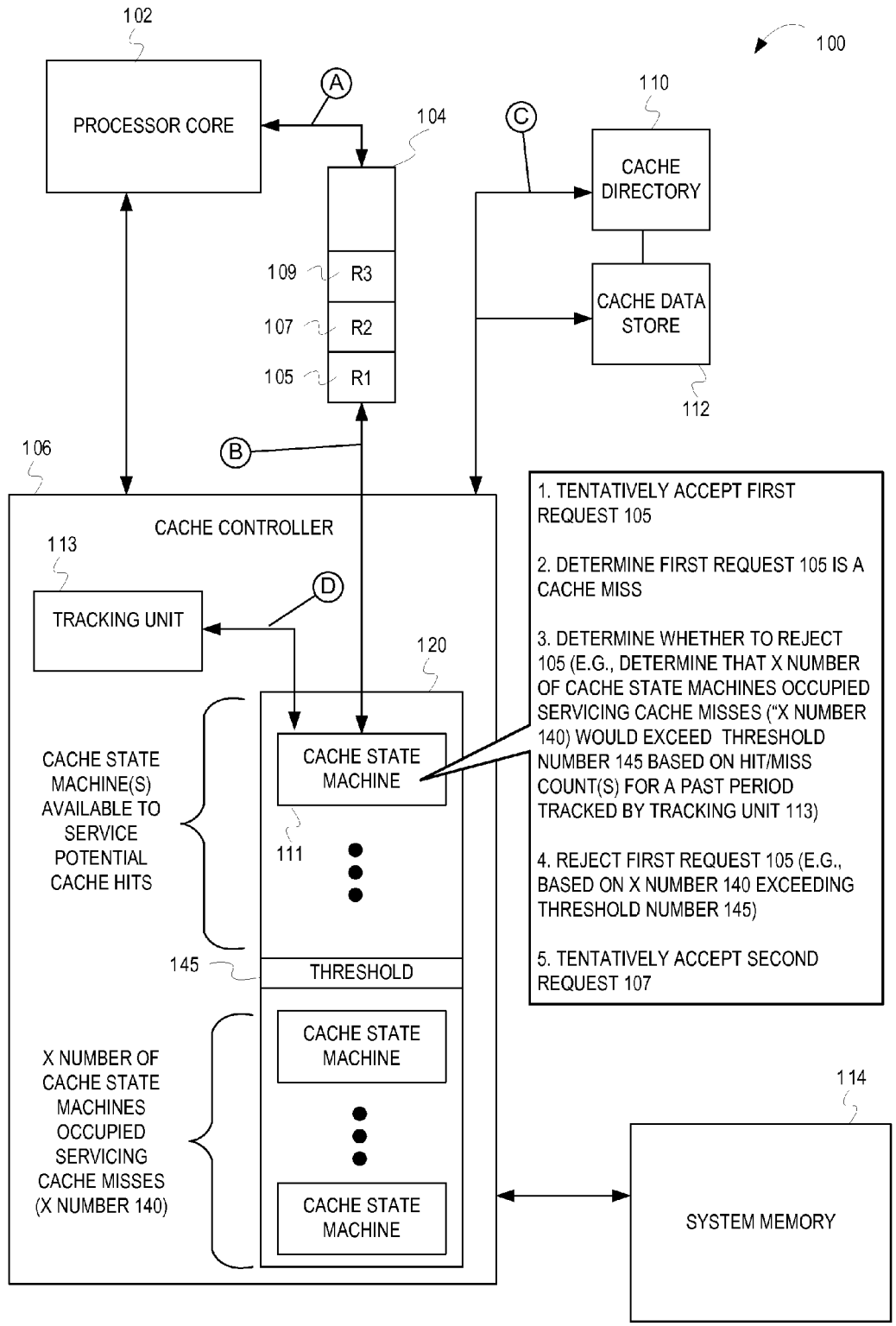
FIG. 1 is an example conceptual diagram of dynamically prioritizing and servicing memory access requests according to some embodiments.

FIG. 1 is an example conceptual diagram of servicing memory access requests according to some embodiments. In FIG. 1 an example computer system 100 includes a processor core ("core") 102, a cache directory 110, a cache data store 112, a dynamic prioritization cache controller ("cache controller") 106, a core interface unit 104, and a system memory 114. The cache controller 106, includes a set of cache state machines 120 used to service memory access requests ("requests") made by the core 102. The cache controller 106 also includes a tracking unit 113, which will be described later.

At stage "A," the core 102 makes a series of requests to the core interface unit (CIU) 104, which buffers the requests in order of receipt. For example, request 105 arrives before request 107, which arrives before request 109. Requests remain in the CIU 104 until one of the cache state machines 120 is available to service the request, for example cache state machine 111. The cache state machine 111 (and any of the other cache state machines 120) is configured to receive requests from the CIU 104 and respond to the request by querying the cache directory 110 to determine whether the request is a cache hit or cache miss. If the query to the cache directory 110 indicates that specific data is in the cache data store 112 (e.g., a cache array), the cache state machine 111 retrieves the data from the cache data store 112. If the data is not in the cache data store 112, then the cache state machine 111 may retrieve the data from a lower level of memory, such as the system memory 114.

At stage "B," for a given clock cycle (e.g., a current clock cycle), when the cache state machine 111 is freed up to service a request, the request 105, which was received first by the CIU 104, is next in line to be serviced. The cache state machine 111, therefore, tentatively accepts the request 105. In other words, the cache state machine 111 receives the request 105 from the CIU 104 and initiates a series of cache coherence operations, described later, by which the cache state machine 111 will eventually determine whether the request 105 is a cache hit or a miss and, consequently, determine whether to reject the request 105 or service the request 105. For instance, if the request 105 is a cache miss, the cache state machine 111 will eventually determine whether to reject the request 105 from being serviced in favor of potentially servicing other requests (e.g., requests 107 or 109) which may be cache hits. Therefore, at stage "B," because the cache state machine 111 may at some future point reject the request 105, the cache state machine 111 makes a copy of the request 105 and tentatively services the copy of the request 105 until the cache state machine 111 determines whether to reject the request 105. The request 105, thus, continues to be buffered in the CIU 104.

At stage "C," the cache state machine 111 queries the cache directory 110 to determine whether the request 105 results in a cache hit or miss. If the request 105 results in a cache hit, the cache state machine 111 performs cache coherence operations to service the cache hit (e.g., reads from and/or writes to the cache data store 112 according to the request 105). The cache controller 106 then deletes or invalidates the request 105 within the CIU 104, and tentatively accepts the request 107. However if, after querying the cache directory 110, the cache state machine 111 determines that the request 105 results in a cache miss, the cache state machine 111, at stage "D," determines whether to reject the request 105 in favor of servicing requests 107 or 109, which may potentially result in cache hits. For example, the cache state machine 111 retrieves, from the tracking unit 113, a count value(s) for cache misses and/or cache hits that have recently occurred within a last specific number of clock cycles relative to a current clock cycle (that have recently occurred within a "window of clock cycles"). The count value for cache misses that have recently occurred within the window of clock cycles may be referred to more succinctly as a "miss count." In some embodiments, there may be a separate miss count for each different thread of instructions that the core is processing if the core is multithreaded, or a single count for all threads being processed. Likewise, a count value for cache hits that have recently occurred within the window of clock cycles may be referred to more succinctly as a "hit count." Similarly, in some embodiments, there may be a separate hit count for each thread being processed if the core is multithreaded, or a single count for all threads being processed. The cache state machine 111 compares the hit/miss count(s) to a tolerance value. The tolerance value may be a programmable usage threshold value ("usage threshold") 145 that represents a maximum number of cache state machines that should be concurrently used for servicing cache misses. The cache controller 106 only has a specific number of cache state machines 120. If all of the cache state machines 120 are occupied servicing requests that are cache misses, which take a relatively long time to service compared to servicing cache hits, then requests buffered within the CIU 104 may have to wait a relatively long time to be serviced. If the requests buffered within the CIU 104 are potentially cache hits, then the memory subsystem could increase efficiency by servicing cache some hits instead of occupying most, or all, of the cache state machines 120 servicing some cache misses. Thus, based on the comparison of the hit/miss count(s) to the tolerance value, the cache state machine 111 determines whether a certain portion of the cache state machines 120 have exceeded the threshold 145 and whether the cache state machine 111 should reject the request 105 and reserve itself to handle potential cache hits instead of servicing another cache miss. For instance, the cache state machine 111 rejects the request 105 (e.g., based on a certain number 140 of the cache state machines 120 exceeding the threshold value 145) and is freed for a new request (e.g., for request 107 which is next in line behind request 105). The cache state machine 111, therefore, tentatively accepts the request 107 to determine whether request 107 should be serviced. The cache state machine 111 then evaluates whether the request 107 results in a cache miss or a cache hit, and, if the request 107 results in a cache miss, the cache state machine 111 can also reject request 107 (e.g., based on updated miss/hit count(s) for a new current clock cycle that increments by one clock cycle from the last clock cycle in which request 105 was evaluated).

In some embodiments, the cache state machine 111 can reject the request 105 by instructing the CIU 104 to buffer the request 105 for a specific number of subsequent clock cycles before re-submitting the request 105 for service (e.g., the CIU 104 waits for a retry back-off period before re-submitting the request 105 to the cache controller 106) or until a specific event occurs (e.g., until the request 105 has been rejected a certain number of times, until a miss count falls below the usage threshold, until a hit count increases by a certain number, etc.). The CIU 104 can send the oldest requests in its queue for evaluation and/or re-evaluation as the delay periods for particular requests terminate. In some embodiments, the cache controller 106 may actively fetch requests from the CIU 104. The cache state machine 111, therefore, may instruct the cache controller 106 that it has rejected the request 105 and the cache controller 106 may delay fetching the request 105 for the specific duration or until the specific event occurs.

In some embodiments, the cache controller 106 includes the CIU 104 and/or logic to control the CIU 104. In some embodiments, logic that performs a directory lookup in the cache directory 110 is duplicated in the CIU 104. As a request (e.g., request 107) approaches a bottom of a queue for the CIU 104, the CIU 104 accesses the cache directory 110 during, or prior to, evaluation of a preceding request (e.g., request 105).

Figure 2:
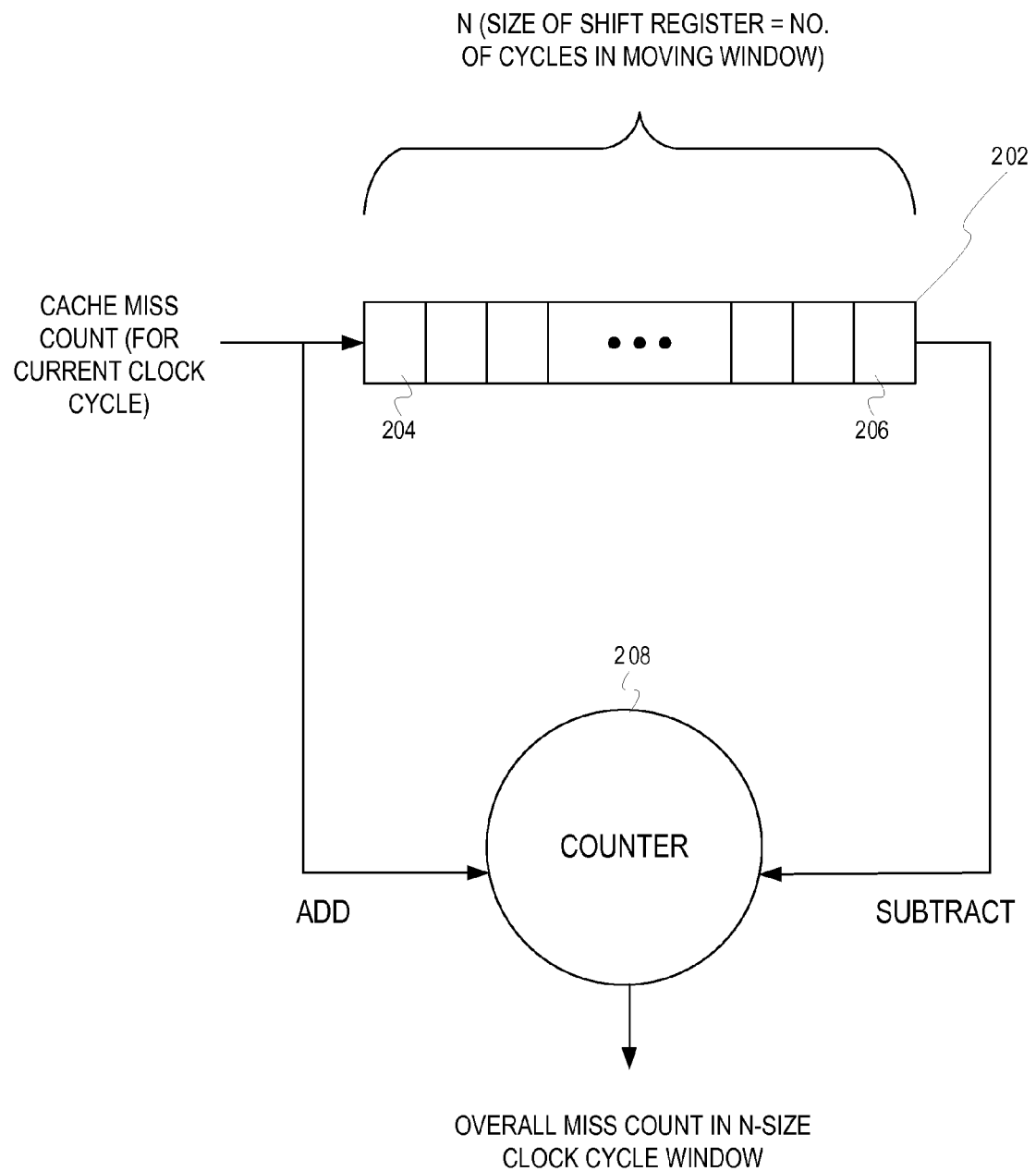
FIG. 2 is an example conceptual diagram of a tracking unit tracking a count of cache misses over a moving window of a specific number of clock cycles according to some embodiments.

FIG. 2 illustrates an example portion of the tracking unit 113 that tracks a count of misses within a moving window of a specific number of clock cycles according to some embodiments. In FIG. 2, a shift register 202 of size "N" (i.e., of "N" number of flip flops) receives as input, into a first flop-flop 204, a number of cache misses that occurred in a clock cycle that occurred immediately before the current clock cycle. At the same time, for the current clock cycle, the shift register 202 shifts out of a last flip flop 206 information on a number of cache misses that occurred N number of clock cycles in the past immediately prior to the current clock cycle. A counter 208 adds and subtracts values entering or leaving, respectively, to maintain an overall miss count for N number of clock cycles within the moving window. In some embodiments, as mentioned previously, the tracking unit 113 can also track cache hits (e.g., via another shift register). The tracking unit 113, therefore, tracks a number of items that enter or fall off tracked lists of misses and/or hits over the moving window of clock cycles. In some embodiments there may be one tracking unit 113 implemented per thread being processed if the core is multithreaded, or there may be a single tracking unit 113 for all threads being processed.

Referring again to FIG. 1, any one of the cache state machines 120, such as the cache state machine 111, can utilize incrementers, dividers, comparators, or other components, to evaluate (e.g., compare) one or more expressions that specify a number of cache misses (or misses and hits) within the moving window of clock cycles against one or more other expressions that specify a tolerance value (e.g., a threshold value or a tolerance factor, related to a limit on usage of one or more portions of cache state machines). In one embodiment the cache state machine 111 compares a miss count against a threshold value (e.g., miss count>threshold value) as illustrated in logic presented in FIG. 3A. In some embodiments, the miss count indicated in the logic may include the number of cache misses that have occurred in the moving window of recent cache misses but not the cache miss that occurs when the request 105 is serviced. In other embodiments, the miss count indicated in the logic may include the number of cache misses that have occurred in the moving window of recent cache misses plus the cache miss that occurs when the request 105 is serviced. In one example, the cache controller 106 includes thirty-two (32) available cache state machines and utilizes a moving window of thirty-two (32) clock cycles. Referring to the logic presented in FIG. 3A, if the request 105 results in a cache miss, the cache state machine 111 compares the miss count against the threshold value and if the miss count exceeds the threshold value, the cache state machine 111 rejects the request 105. For instance, if the threshold value is thirty (30) and if the miss count is thirty-one (31), then the cache state machine 111 determines that the miss count of thirty-one (31) exceeds (i.e., is greater than) the threshold value of thirty (30). Thus, the cache state machine 111 rejects the request 105. The threshold value can change dynamically as any of the cache state machines 120 becomes inoperable or operable within a computer's memory sub-system. For example, if one or more number of the cache state machines 120 become disabled, powered down, etc., the threshold value can adjust proportionately to the one or more number of cache state machines 120 that become disabled, powered down, etc.

In another embodiment, as illustrated in logic presented in FIG. 3B, the cache state machine 111 compares a ratio of cache hits versus cache misses to a threshold value (e.g., hit count/miss count<threshold value). In another example, as illustrated in the logic presented in FIG. 3C, the cache state machine 111 compares ratios of hits to misses plus a tolerance value (e.g., (hit count/miss count)<(hit count/(miss count+ 1))+tolerance value).

Regardless of whether the cache state machine 111 compares only misses to threshold values or ratios of hits and misses to threshold values, the cache state machine 111 is detecting whether recent activity in the memory subsystem (e.g., within the moving window of clock cycles) indicates significant numbers of misses and/or hits. In other words, the cache state machine 111 determines, based on the hit/miss count(s) whether a significant number of cache state machines 120 are being utilized for cache misses and/or cache hits that have recently occurred. Based on that information, the cache state machine 111 estimates whether multiple cache misses and/or cache hits would be likely to occur in subsequent clock cycles based on numbers of the numbers of cache hits/misses that occurred recently. The cache state machine 111, thus, estimates whether rejecting or accepting an additional cache miss would be efficient or inefficient based on the number of recent cache misses and/or cache hits. In some embodiments, if the cache state machine 111 detects a large number of cache misses within the moving window compared to cache hits, the cache state machine 111 rejects a request because rejecting the request reserves the cache state machine 111 for servicing potential cache hits. On the other hand, in some embodiments, if the cache state machine 111 detects that a vast majority of recent activity has resulted in cache misses, (e.g., if the last few clock cycles in the window have all been cache misses) or if a growing number of requests are resulting in cache misses (e.g., if the last few clock cycles in the window are producing increasingly higher counts of cache misses), then the cache state machine 111 may instead decide to not reject the request as such high numbers of recent cache misses tend to indicate activity that would not likely result in a cache hit within one or more subsequent clock cycles. Some examples of activity that would not likely result in a cache hit may include a burst of requests associated with new transactions (e.g., launching a new applications, opening new records in a database, performing a series of unique computations, etc.) that generate a burst of different types of requests and, consequently, bursts of cache activity that need to access system memory, resulting in consistent cache misses.

The tracking unit 113 can track any number of clock cycles (e.g., 8, 16, 32, 64, etc.). In some embodiments, the number of clock cycles is equivalent to the number of cache state machines 120. In other embodiments, the number of clock cycles in the window is more or less than the number of cache state machines 120. In some embodiments, a longer window (i.e., a window of a number of clock cycles that is more than a number of cache state machines 120) can be advantageous over a shorter window. For example, a longer window can produce a more accurate representation of a history of hits and misses for some embodiments that evaluate an expression with a ratio of a hit count and a miss count. If however, the window is too long, a distant history of the hit count and miss count can taint a more recent history of hits and misses.

Figure 4:
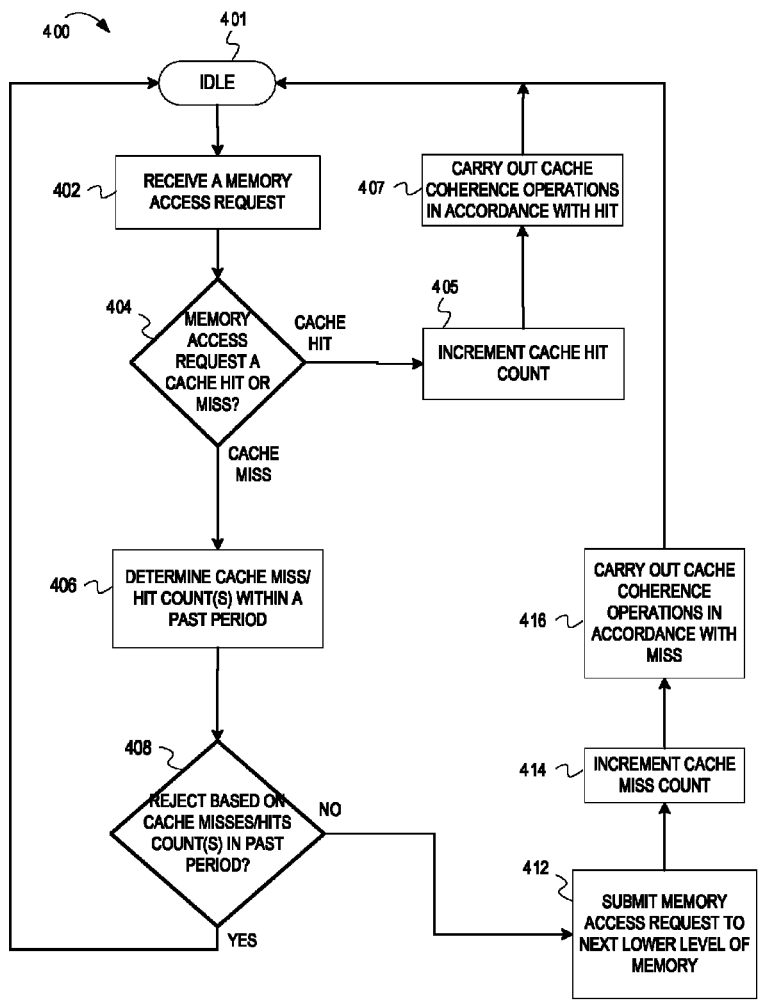
FIG. 4 is a flowchart depicting example operations for dynamically prioritizing a memory access request based on a history of cache activity within a moving window of clock cycles.

FIG. 4 is a flowchart depicting example operations for dynamically prioritizing a memory access request based on a history of cache activity within a moving window of clock cycles. For example purposes, operations associated with the blocks in FIG. 4 will be described as being performed by a cache state machine. FIG. 4 illustrates a flow 400 that the cache state machine can perform.

Referring to FIG. 4, the cache state machine begins in an idle state (401) where it awaits receipt of a memory access request. At a given clock cycle (e.g., a "current" clock cycle"), the cache state machine receives a memory access request (402). For example, the cache state machine may be scheduled to handle a next memory access request that is in a queue of memory access requests, and receives the memory access request as the memory access request reaches the bottom of the queue.

Referring again to FIG. 4, the cache state machine determines, whether the memory access request results in a cache hit or a cache miss (404). For example, the cache state machine tentatively accepts the memory access request and queries a cache memory to determine whether certain information included in the request is contained, or not contained, within the cache memory. If the query indicates that the information is not in the cache memory, then the cache state machine determines that the memory access request results in a cache miss. If the query indicates that the information from the memory access request is in the cache memory, then the cache state machine determines that the memory access request results in a cache hit. If the memory access request results in a cache hit, the cache state machine increments a cache hit count (405) and carries out cache coherence operations in accordance with the cache hit (407). For example, if the cache hit is a read request, the cache state machine may retrieve data associated with the request (e.g., read a memory cache address and access data associated with the memory cache address, then return the data to a processor core). If the cache hit is a request that writes data back to the cache, the cache state machine may write data included in the request to a cache block associated with a memory address indicated in the memory request. The cache adherence operations can vary depending on a cache adherence protocol. For example, if the cache adherence protocol utilizes a write back with a write allocation, the cache state machine sets a dirty bit for a cache block for write type of memory access request. After completing the cache adherence operations, the cache state machine returns to an idle state (401) and awaits an additional memory access request. If, however, the cache state machine determines that the memory access request would result in a cache miss (404), the cache state machine determines a count, or counts, for cache misses and/or hits ("cache miss/hit count(s)") that have occurred within a past period (406). In some embodiments, the cache state machine queries a tracking unit that tracks, at least, a number of cache misses that have occurred within a moving window of a given number of clock cycles relative to the current clock cycle ("miss count"). In some embodiments, the cache state machine also queries the tracking unit for a number of cache hits that have occurred within the moving window of the given number of clock cycles relative to the current clock cycle ("hit count"). The given number of clock cycles in the moving window may be the clock cycles that are immediately before the current clock cycle. In another example, the window of the given number of clock cycles in the window may be one or more several clock cycles behind the current clock cycle. The cache state machine also performs comparisons between the cache misses and/or hits to one or more tolerance values or thresholds. For example, the cache state machine includes logic that evaluates a miss count against a programmable usage threshold value ("usage threshold") as similarly described in FIG. 3A. The usage threshold corresponds to a maximum portion of the plurality of cache state machines that should be utilized concurrently to process cache misses. The cache state machine determines whether the miss count is within the usage threshold. For example, the cache state machine determines whether the miss count exceeds (e.g., is greater than) the usage threshold (e.g., miss count>threshold value). If the miss count exceeds the threshold, then the cache state machine determines to reject the memory access request. In some embodiments, as described in FIG. 3B, the cache state machine computes a ratio (or queries a tracking unit for a computation of a ratio) of a hit count versus a miss count (hit-to-miss ratio). The cache state machine then determines whether the hit-to-miss ratio is less than a threshold value (e.g., hit count/miss count<threshold value). If the hit-to-miss ratio is less than the threshold, then the cache state machine determines to reject the memory access request. In other embodiments, as in FIG. 3C, the cache state machine computes a first hit-to-miss ratio and compares the first hit-to-miss ratio to a second, modified hit-to-miss ratio that includes a hit count divided by a sum of the miss count plus one (1) (e.g., see FIG. 3C). The cache state machine can further add the modified hit-to-miss ratio to a tolerance factor, and compare the sum to the first hit-to-miss ratio. If the first hit-to-miss ratio is less than the sum of the modified hit-to-miss ratio and the tolerance factor, then the cache state machine determines to reject the memory access request.

If the cache state machine rejects the memory access request, then the cache state machine returns to an idle state 401 and awaits a new memory access request. If, however, the cache state machine does not reject the memory access request, even though the memory access request results in a cache miss, then the cache state machine submits the memory access request to a next lower level of memory (412), such as to a cache controller for lower level cache or to a memory controller associated with system memory. The cache state machine then increments the miss count (414) and carries out cache coherence operations in accordance with the cache miss (416). For example, the cache state machine may submit instructions to an additional cache state machine at a lower level cache. The additional cache state machine may perform a similar procedure that determines a cache hit or miss at the lower level cache, determine additional cache hit/miss counts for the past period for that lower level of cache, and reject the memory access request from the lower level of cache based on the additional cache hit/miss counts. In other examples, if there are no additional lower levels of cache, the cache state machine may forward the request to a memory controller for a system memory. In some embodiments, the cache state machine can enter an additional idle state as it waits for information from the lower level of memory. When it receives the information from the lower level of memory, the cache state machine can provide the information to the core and write the information to the cache at a cache address associated with the memory access request. The cache state machine can then return to the idle state (401) and await an additional memory access request.

As stated previously, the cache state machine rejects a memory access request (408) based on a comparison of cache miss/hits within a past period to a tolerance value. After the cache state machines rejects the memory access request, the memory access request is buffered are resubmitted after several clock cycles subsequent to the current clock cycle at which time another available cache state machine can perform the operations of flow 400 for the memory access request. After the current clock cycles, for each subsequent clock cycles thereafter, the moving window of clock cycles shifts so that the window of clock cycles remains relative to a then current clock cycle.

Figure 5:
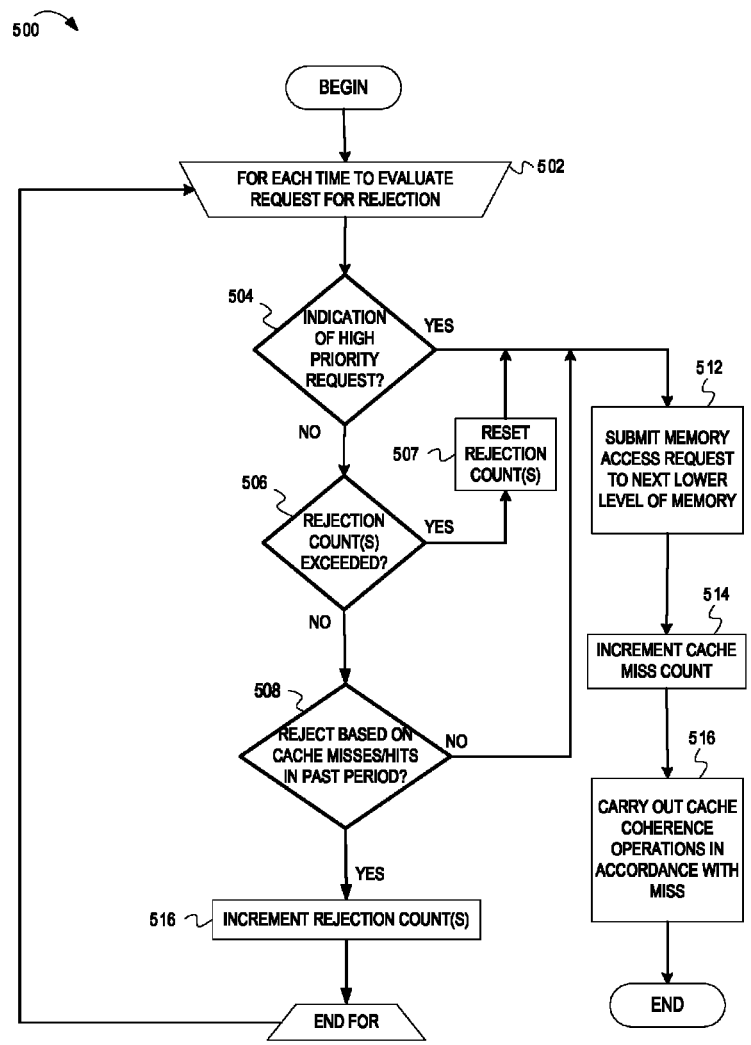
FIG. 5 is a flowchart depicting example operations for dynamically prioritizing a memory access request.

FIG. 5 is a flowchart depicting example operations for dynamically prioritizing a memory access request. In FIG. 5, for each time a cache state machine evaluates a memory access request for rejection (502), the cache state machine performs operations that evaluate factors that may override a decision to reject a memory access request. First, the cache state machine determines whether the memory access request is a high priority request (504). For example, the cache state machine may detect an indicator (e.g., included in the memory access request), from a processor core that indicates a high priority for the memory access request. If the cache state machine determines that the memory access request is high priority, the cache state machine submits the memory access request to a next lower level of memory (512) as similarly described in flow 400. The cache state machine further increments a miss count (514) and carries out cache coherence operations in accordance with the cache miss (516) as similarly described in flow 400.

If the cache state machine determines that the memory access request is not a high priority, the cache state machine determines whether one or more rejection counts have been exceeded (506). In some embodiments, the cache state machine keeps a rejection count of a number of rejected requests. One type of rejection count includes a number of times that a specific memory access request has been rejected. Another type of rejection count includes a total number of times that any memory access requests have been rejected. When one or more of the rejection counts exceeds certain rejection threshold levels (e.g., if a particular memory access request has been rejected more than a specific number of times and/or if a total number of rejected memory access requests exceeds a certain number of rejections), the cache state machine resets the one or more rejection counts (507), submits the memory access request to the next lower level of memory (512), increments the miss count (514) and carries out cache coherence operations in accordance with the cache miss (516). Rejection count levels can change dynamically based on various factors, such as a number of cache state machines that are operational, an average latency period for requests from memory, an amount of time a request is delayed before being re-evaluated, etc. If the rejection count does not exceed the rejection count level (506), then the cache state machine re-evaluates the memory access request (e.g., evaluates updated hit/miss counts against a tolerance) and determines whether to reject the memory access request (508) (similar to 408 of flow 400). If the cache state machine determines to not reject the request (508), the cache state machine submits the memory access request to the next lower level of memory (512), increments the miss count (514) and carries out cache coherence operations in accordance with the cache miss (516). If the cache state machine determines to reject the request (508) the cache state machine increments the rejection count (516). The flow 500 returns to the beginning of the for loop (502).

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct an electronic device (e.g., computer, cell phone, television, set-top box, programmable data processing apparatus, etc.) to function in a particular manner, such that the instructions stored in the computer readable medium produce an article of manufacture including instructions which implement the function/act specified in the flowchart and/or block diagram block or blocks.

The computer program instructions may also be loaded onto an electronic device to cause a series of operational steps to be performed on the electronic device to produce a computer implemented process such that the instructions, which execute on the electronic device, provide processes for implementing the functions/acts specified in the flowchart and/or block diagram block or blocks.

Figure 6:
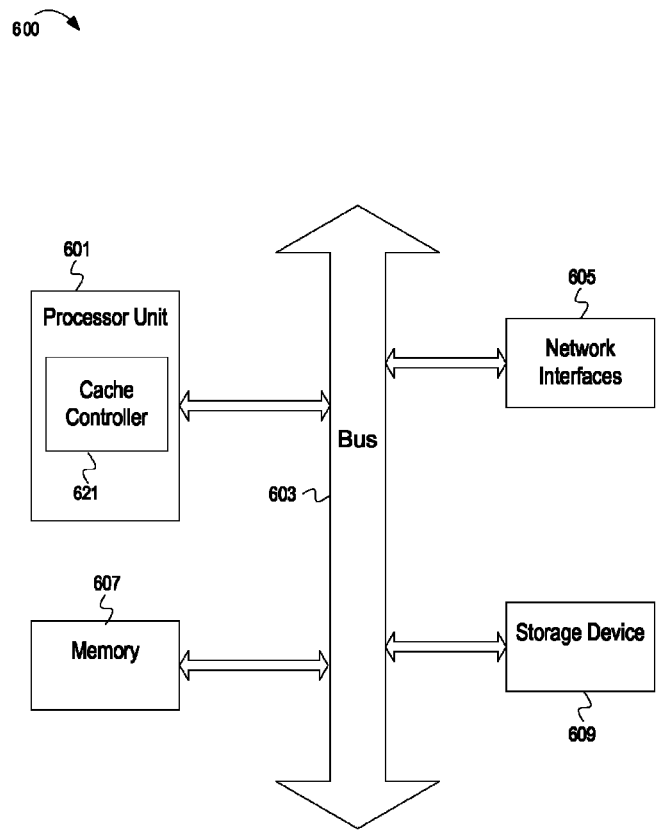
FIG. 6 depicts an example computer system.

FIG. 6 depicts an example computer system 600. The computer system 600 includes a processor unit 601 (possibly including multiple processors, multiple cores, multiple nodes, and/or implementing multi-threading, etc.). The computer system 600 includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable storage media or computer readable storage media. The computer system 600 also includes a bus 603 (e.g., PCI bus, ISA, PCI-Express bus, HyperTransport® bus, InfiniBand® bus, NuBus bus, etc.), a network interface 605 (e.g., an ATM interface, an Ethernet interface, a Frame Relay interface, SONET interface, wireless interface, etc.), and a storage device(s) 609 (e.g., optical storage, magnetic storage, etc.). The computer system 600 also includes a cache controller 621 coupled with the processor unit 601. The cache controller 621 can dynamically prioritize memory access requests according to embodiments of the inventive subject matter. Any one of these functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601, the storage device(s) 609, and the network interface 605 are coupled to the bus 603. Although illustrated as being coupled to the bus 603, the memory 607 may be coupled to the processor unit 601.

While the embodiments are described with reference to various implementations and exploitations, it will be understood that these embodiments are illustrative and that the scope of the inventive subject matter is not limited to them. In general, techniques for dynamically prioritizing memory access requests as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A cache comprising:
a cache directory;
a cache array; and
a cache controller coupled to the cache directory and the cache array, the cache controller comprising,
a tracking unit configured to track an amount of cache resources used to service cache misses within a past period, and
a plurality of cache state machines, wherein each of the plurality of cache state machines is configured to,
determine whether a memory access request results in a cache miss or cache hit,
in response to a cache miss for a memory access request, query the tracking unit for the amount of cache resources used to service cache misses within the past period, and
service the memory access request based, at least in part, on the amount of cache resources used to service the cache misses within the past period according to the tracking unit.

2. The cache of claim 1 wherein the tracking unit comprises at least one shift register and at least one counter, wherein the at least one shift register comprises a number of flip flops equivalent to a number of clock cycles that comprise the past period, wherein the at least one shift register is configured to track within each of the flip flops, a portion of the cache misses that occurs within each of the of clock cycles, and wherein the at least one counter is configured to add individual counts of the cache misses stored in each of the flip flops to generate a total cache miss count.

3. The cache of claim 1 wherein each of the plurality of cache state machines is configured to service the memory access request based, at least in part, on the amount of cache resources used to service the cache misses within the past period according to the tracking unit being configured to
request a count of the cache misses over a number of clock cycles from the tracking unit,
compare the count of the cache misses to a tolerance value that corresponds to reservation of a given amount of the plurality of cache state machines for potential cache hits, and
determine whether to reject the memory access request or perform a plurality of cache coherence operations in accordance with a cache miss in response to comparison of the count of the cache misses to the tolerance value.

4. The cache of claim 1 wherein each of the plurality of cache state machines is configured to service the memory access request based, at least in part, on the amount of cache resources used to service the cache misses within the past period according to the tracking unit being configured to
request a count of the cache misses over a number of clock cycles from the tracking unit,
request a count of cache hits over the number of clock cycles from the tracking unit,
compute a ratio of the count of the cache hits to the count of the cache misses, compare the ratio to a threshold value that corresponds to a limit of the plurality of cache state machines to be used to concurrently service cache misses, and determine whether to reject the memory access request or perform a plurality of cache coherence operations in accordance with a cache miss based on comparison of the ratio to the threshold value.

5. The cache of claim 1 wherein each of the plurality of cache state machines is configured to service the memory access request based, at least in part, on the amount of cache resources used to service the cache misses within the past period according to the tracking unit being configured to request a count of the cache misses over a number of clock cycles from the tracking unit, request a count of cache hits over the number of clock cycles from the tracking unit, compute a first value that comprises count of the cache hits divided by the count of the cache misses, compute a second value that comprises the count of cache hits divided by a sum of the count of cache misses plus one, compute a third value that comprises the a sum of a tolerance factor to the second value, wherein the tolerance factor corresponds to a limit of the amount of cache resources used to service cache misses within the past period, compare the first value to the third value, and determine whether to reject the memory access request or perform a plurality of cache coherence operations in accordance with a cache miss based on comparison of the first value to the third value.

6. The cache of claim 1 wherein the each of the plurality of cache state machines is further configured to determine a count value of one or more of a number of rejections of the memory access request and a number of rejections of memory access requests previous to the memory access request, and service the memory access request based, at least in part, on the count value.

7. The cache of claim 6 wherein the each of the plurality of cache state machines is configured to service the memory access request based, at least in part, on the each of the plurality of cache state machines being configured to determine that the count value exceeds a rejection count threshold, and service the memory access request based on the count value exceeding the rejection count threshold.

8. An apparatus comprising:

a processor; and a cache controller coupled with the processor, the cache controller configured to receive memory access requests from the processor, the cache controller comprising a plurality of cache state machines, wherein each of the plurality of cache state machines is configured to, tentatively accept one of the memory access requests, determine that the one of the memory access requests results in a cache miss, determine an amount of usage of the plurality of cache state machines within a past period, determine that at least one of the plurality of cache state machines is to be reserved for potential future cache hits based on the amount of usage of the plurality of cache state machines within the past period in response to determination that the one of the memory access requests results in the cache miss, and reject the memory access request in response to determination that the at least one of the plurality of cache state machines is to be reserved for the potential future cache hits.

9. The apparatus of claim 8 further comprising a core interface unit configured to buffer the memory access requests, wherein the cache controller is configured to fetch the one of the memory access requests buffered in the core interface unit.

10. The apparatus of claim 8, wherein the past period comprises a number of computer clock cycles prior to a clock cycle from which the one of the memory access requests is tentatively accepted, and wherein the each of the plurality of cache state machines is configured to reject the memory access request being configured to delay service of the memory access request for a number of clock cycles subsequent to the clock cycle from which the memory access request is tentatively accepted.

11. The apparatus of claim 8, wherein the each of the plurality of cache state machines is configured to determine that the at least one of a plurality of cache state machines is to be reserved for potential future cache hits based on the amount of usage of the plurality of cache state machines within the past period being configured to determine a first value that comprises one or more of a cache hit count for the past period, a cache miss count for the past period, and a ratio of a cache hit count for the past period to a cache miss count for the past period, compare the first value to a second value that comprises at least a tolerance factor that corresponds to a limit of the plurality of cache state machines to be used to concurrently service cache misses, and determine, based on comparison of the first value to the second value, that the at least one of the plurality of cache state machines is to be reserved for potential future cache hits.

12. The apparatus of claim 11, wherein the cache controller is further configured to determine that a number of the plurality of cache state machines becomes inoperable, and adjust the tolerance factor based on the number of the plurality of the cache state machines that become inoperable.

* * * * *